United States Patent Office 3,523,998
Patented Aug. 11, 1970

3,523,998
METHOD OF WRINKLE SMOOTHING
Wolffe Harry Feinstone, Memphis, Tenn., and Archie Scott Black, deceased, late of Memphis, Tenn., by Gladys Doyle Black, legal representative, Memphis, Tenn., assignors to Plough, Inc., Memphis, Tenn., a corporation of Tennessee
No Drawing. Continuation-in-part of application Ser. No. 451,069, Apr. 26, 1965. This application Oct. 24, 1967, Ser. No. 677,782
Int. Cl. A61k 7/00, 27/00
U.S. Cl. 424—78
10 Claims

ABSTRACT OF THE DISCLOSURE

Method of temporarily smoothing wrinkles from human skin by applying to the skin area to be smoothed an aqueous solution containing between 5 and 20% by weight of one or more of poly-N-vinyl-5-methyl-2-oxazolidinone, dextran and ethylene-maleic anhydride copolymer and permitting the solution to dry undisturbed on the skin. The solution may contain any one or more of sodium carboxymethyl cellulose, innocuous alcohol, propylene glycol, polyethylene glycol, and glycerine, perfuming and even coloring agents if desired.

RELATED APPLICATIONS

This application is a continuation-in-part of our application Ser. No. 451,069 filed Apr. 26, 1965, now abandoned.

BACKGROUND OF THE INVENTION

This invention relates to preparations which possess the property of smoothing the wrinkles on the human skin. Because of the widespread desire of people to retain a more youthful appearance with advancing years, there is a great demand for agents which might prevent, correct or conceal wrinkles, particularly on the face and neck.

Many preparations have been promoted for the treatment of wrinkles. One type consists of creams or lotions which are supposed to improve the tone or increase the water content of the skin to give an appearance of fullness. Some of these have contained hormones or steroids which are claimed to enhance the effect of the creams by some physiological or pharmacological action. At best, long periods of treatments with such products are required and the end results have been indefinite.

Another type of wrinkle smoothing agent is a solution of blood serum albumin, commonly that derived from cattle. When this portion solution, usually a 15 percent concentration, is applied to the skin, the wrinkles are smoothed by a physical action. The effects are temporary, lasting only a few hours, when the film disintegrates.

Blood serum albumin has many objectionable properties. In the first place, the bovine product, which is the most readily available, is very expensive. A 15 percent solution presently costs about $50.00 a liter. On a dry basis the albumin would now cost at least $150.00 per pound. Solutions of serum albumin are not stable, they gradually develop a precipitate due to denaturalization of the protein. Furthemore, such solutions are excellent media for the growth of microorganisms so that great care must be taken to prevent contamination. The solution must be stored in a cool place preferably under refrigeration. Some poeple are allergic to animal proteins and serious reactions could result if they are applied to their skin. The film which is produced by the serum albumin frequently becomes rough and scaly within less than an hour after application.

One of the objects of this invention is to provide a relatively inexpensive, relatively long lasting and relatively stable composition for the smoothing of wrinkles in the human skin, as compared with compositions now used for that purpose.

Another object is to provide such a composition which is less allergenic than some of the wrinkle smoothing compositions known heretofore.

Still another object is to provide a composition which is readily applied, effective and safe.

Other objects will become apparent to those skilled in the art in the light of the following description.

In accordance with this invention, generally stated, we have discovered that certain particular water-soluble polymers can be used for smoothing wrinkles. These polymers even now cost less than $2.00 per pound as compared to the $150.00 per pound for dried bovine serum albumin. These polymers are innoccuous when applied to the skin and their solutions are quite stable. When solutions of these polymers are applied to the skin over the wrinkles, a transparent film is developed on drying, which is continuous. It adheres very strongly to the skin and has the ability to draw the indentations in the skin outward to the same plane as that of the surrounding skin, so that the wrinkles are no longer evident. This film also has considerable rigidity to hold the skin in place.

In order to achieve the desired rigidity of the film, a solution of the polymers is prepared which contains at least 5 percent by weight of the polymers. However, these particular polymers form solutions with relatively low viscosities, so that the solution can easily be poured and can be applied to the skin in an even layer.

Examples of water soluble polymers, which possess these properties are poly-N-vinyl-5-methyl-2-oxazolidinone (a commercial form of which is available under the trademark Devlex 130, a product of Dow Chemical Company), dextran having a molecular weight of between about 40,000 and 100,000, a mixture of Devlex 130 or dextran and sodium carboxymethylcellulose of low viscosity, and certain copolymers prepared by reacting ethylene with maleic anhydride (commercial forms of which are available under the designation EMA from Monsanto Company). Suitable sodium carboxymethylcellulose has a viscosity, in 2% water solution, of 25–30 cps. at 25° C. Devlex 130 is reported to have the following structural formula:

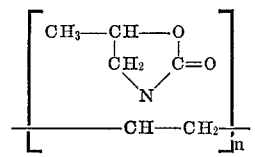

It has a molecular weight per unit of 127.14 and is reported to have an average molecular weight, as the polymer, of 165,000. The exact average molecular weight is of no significance to this invention ,and the term "about 165,000" is used to embrace the range of useful molecular weights of poly-N-vinyl-5-methyl-2-oxazolidinone. Solutions which contain 5 to 20 percent of Devlex 130 or 10–20 percent of dextran in water or water and alcohol, possess the desired wrinkle smoothing property.

Dextran is a linear glucose polymer with the empirical formula $(C_6H_{10}O_5)_n$. The polymer may be partially hydrolyzed to form the types having molecular weights ranging between about 40,000 and 100,000, which are preferred for the practice of this invention.

The ethylene maleic anhydride copolymers particularly suited for this application, such, for example as EMA–11, EMA–21 and EMA–31, are linear polymers, as distinguished from crosslinked polymers, and have the following general formulas:

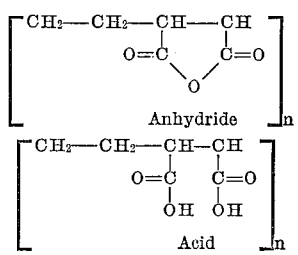

The anhydride is converted to the acid when suspended in water. The solutions of the acid are clear and have a pH between 1.5 and 2. Their viscosities vary from about 15 in a 10% solution to 100 in a 20% solution. The acids may be converted to salts by neutralization with alkalis such as sodium hydroxide, ammonium hydroxide and triethanolamine. The viscosities of the salts are substantially higher than those of the acids. Solutions of the acids or solutions which are partially neutralized with alkali and have a higher pH, for example, 3 to 7, possess the desired wrinkle smoothing property. The operative and particular concentration of the copolymer is 5 to 25 percent. As has been indicated by the several designations of the copolymers by the Monsanto Company, there are a number of these ethylene-maleic anhydride copolymers. Characteristics of various of these copolymers are described in Technical Bulletin 1-261 of the Monsanto Company. For example, EMA-11 is listed as having a viscosity, in a 2% solution, measured at normal product pH, of 2.0 cpc., EMA-21, of 5.0 cps., and EMA-31, of 7.0 cps. As has been indicated, these particular ethylene-maleic anhydride copolymers have proven effective. However, as can readily be appreciated, the particular viscosities are not of controlling importance as long as the viscosity permits effective application. Accordingly, the expression "having a viscosity in the general range of 2.0 to 7.0 cps. in a 2% solution in the acid form" is used in an illustrative rather than a limitative sense, to indicate the order of magnitude of suitable viscosity, as distinguished, for example, from some of the cross-linked anhydrides which have viscosities in the ranges of 100 to 8500.

Various moisturizing and plasticizing agents such as the polyglycols, glycols, polyvinylpyrrolidone or pantothenyl alcohol may be added to the solution to modify the film.

While the wrinkle smoothing solutions of this invention are resistant to bacterial attack as compared with serum albumin, various antiseptic agents may be added to insure against degradation. Suitable antiseptic agents include, by way of example, methylparaben, propylparaben, benzoic acid, sorbic acid and benzalkonium chloride.

Suggestion has been made in literature of the Dow Chemical Company (e.g., a bulletin entitled "Devlex 130" dated August 1960) that Devlex 130 might have use in wave sets, hair grooms, as an emollient in skin lotions and shaving preparations, and in the formulation of beauty masks. Dextran has been used as blood plasma extender, in various food products and for a variety of other uses. However, it is common knowledge that numerous compositions for these various purposes are commercially available which have no wrinkle smoothing properties. The wrinkle smoothing properties of Devlex 130 and of dextran, resulting from the peculiar formulations of this invention, have evidently not been discovered heretofore.

The following non-limiting examples illustrate various embodiments of compositions of the present invention which can be used to carry out the method of smoothing wrinkles.

Example 1

Devlex 130 (Dow Chemical Co.)—10 gm.
Water, q.s.—100 ml.

The polymer, in the form of a white powder, is added slowly to 75 ml. of water with mixing. When the solution is complete, the volume is adjusted by addition of water. A clear light yellow solution results.

Example 2

Devlex 130—15 gm.
Water, q.s.—100 ml.

Solution prepared the same as Example 1.

Example 3

Devlex 130—15 gm.
Alcohol SDA 39c (95% ethanol denatured with diethyl phthalate)—25 ml.
Water, q.s.—100 ml.

The polymer is suspended in the alcohol and 60 ml. of water is added with stirring. When the solution is complete, the volume is adjusted with water.

Example 4

Devlex 130—10 gm.
Propylene glycol—3 gm.
Water, q.s.—100 ml.

The polymer is added slowly to 75 ml. water with stirring. When the solution is complete, the propylene glycol is added and the volume is adjusted with water.

Example 5

Devlex 130—15 gm.
Polyglycol E4000 (polyethylene glycol with an average molecular weight of about 4,000)—2 gm.
Water, q.s.—100 ml.

The polymer is added slowly to 75 ml. of water with mixing. When the solution is complete, the polyglycol E4000 dissolved in 10 ml. water is added and the volume is adjusted by the addition of water.

Example 6

Dextran—15 gm.
Water—100 ml.

The dextran is added slowly to 70 ml. water with mixing. When the solution is complete the volume is adjusted with water.

Example 7

Devlex 130—5 gm.
Sodium carboxymethylcellulose (low viscosity)—2 gm.
Water, q.s.—100 ml.
Alcohol SDA 39c—25 ml.

The sodium carboxymethylcellulose is dissolved in 60 ml. water with the aid of heat and then cooled to room temperature. The Devlex 130 is suspended in the alcohol. The carboxymethylcellulose solution and Devlex 130 solutions are combined and stirred. When the solution is complete the volume is adjusted with water.

Example 8

Devlex 130—15 gm.
d-Pantothenyl alcohol—2 gm.
Water—100 ml.

The polymer is added slowly to 75 ml. water with mixing. When the solution is complete, the d-pantothenyl alcohol is added and the volume is adjusted by the addition of water.

Example 9

Devlex 130—15 gm.
Polyglycol E200 (polyethylene glycol having an average molecular weight of about 200)—2 gm.
Water, q.s.—100 ml.

The polymer is added slowly with mixing. When the solution is complete, the polyglycol is added and the volume is adjusted with water.

Example 10

Devlex 130—60 gm.
Water, q.s.—200 ml.

The polymer is added slowly to 140 ml. of water with mixing. When the solution is complete, the volume is adjusted with water.

Example 11

Dextran—15 gm.
Alcohol SDA 39c—25 ml.
Water, q.s.—100 ml.

The dextran is suspended in the alcohol and 60 ml. of water are added with mixing. When the solution is complete the volume is adjusted with water.

Example 12

Ethylene (maleic anhydride copolymer EMA–11)—45 g.
Water, q.s.—225 g.

The copolymer is added to 150 cc. of hot water (95%) with stirring. The suspension is heated on a steam bath and stirred until solution is complete (about 15 minutes). Water is added to make 225 cc. of 20% solution, which is nearly colorless and slightly viscous and has a pH 1.65.

Example 13

Ethylene (maleic anhydride copolymer EMA–11)—10 g.
Sodium hydroxide (20% solution)—6 cc.
Water, q.s.—100 g.

The copolymer is added to 60 cc. of hot water (95° C.) with stirring. The suspension is heated on a steam bath until solution is complete (about 15 minutes). The solution is allowed to cool and 6 cc. of 20% sodium hydroxide solution is added with stirring. Water is added to make 100 g. and thoroughly mixed. The clear nearly colorless solution has a pH of 3.7.

Example 14

15% ethylene-maleic copolymer EMA–11 solution (11 solution—neutralized to pH 3 with sodium hydroxide)—50 g.
Polysorbate 80 USP (Tween 80, polyoxyethylene (20) sorbitan mono-oleate)—0.5 g.

The polysorbate 80 is added to the copolymer solution and thoroughly mixed.

Example 15

15% ethylene-maleic copolymer EMA–11 solution (11 solution—neutralized to pH 3 with sodium hydroxide)—50 g.
Benzalkonium chloride—0.005 g.

0.01 g. of a 50% solution of benzalkonium chloride is added to the copolymer solution and thoroughly mixed.

Example 16

15% ethylene-maleic copolymer EMA–11 solution (11 solution—neutralized to pH 3 with sodium hydroxide)—50 g.
Sodium benzoate—0.1 g.

The sodium benzoate is added to the copolymer solution and thoroughly mixed.

Example 17

Ethylene-maleic anhydride copolymer EMA–11—120 g.
Methylparaben—1.02 g.
Propylparaben—0.18 g.
Sodium hydroxide (20% solution)—72 cc.
Water, q.s.—600 g.

The copolymer is added to 400 cc. of hot water (95° C.) with stirring. The suspension is heated on a steam bath and stirred until solution is complete. After cooling the sodium hydroxide is added and thoroughly mixed. Water is added to make 600 g. and thoroughly mixed. The nearly colorless solution has a pH of 3.4.

Example 18

Ethylene-maleic copolymer solution (Example 17)—98 g.
Propylene glycol—2 g.

Propylene glycol is added to the copolymer solution and thoroughly mixed.

Example 19

Ethylene-maleic copolymer solution (Example 17)—98 g.
Polyglycol E 600—2 g.

Prepared as per Example 18.

Example 20

Ethylene-maleic copolymer solution (Example 17)—98 g.
Polyglycol E4000—2 g.

Prepared as per Example 18.

Example 21

Ethylene-maleic copolymer solution (Example 17)—98 g.
Glycerine—2 g.

Prepared as per Example 18.

Example 22

Ethylene-maleic anhydride copolymer EMA–31—30 g.
Water, q.s.—200 g.

The copolymer is added to 150 cc. of hot water (95° C.) with stirring. The suspension is heated on a steam bath and stirred until solution is complete. Water is added to make 200 g. A light yellow slightly viscous solution with a pH of 1.65 was formed.

Example 23

Ethylene-maleic copolymer solution (Example 22)—50 g.
0.5 N sodium hydroxide solution—25 cc.

The sodium hydroxide solution aws added to the copolymer solution and thoroughly mixed. The slight viscous 10% solution has a pH of 3.0.

Example 24

Ethylene-maleic copolymer solution (Example 22)—50 g.
Ammonium hydroxide, q.s.—pH 3
Water, q.s.—75 g.

The ammonium hydroxide is added to the copolymer solution and thoroughly mixed. Water is added to make 75 g. of 10% solution and thoroughly mixed.

Example 25

Ethylene-maleic copolymer solution (Example 11)—50 g.
Triethanolamine, q.s.—pH 3.0
Water, q.s.—75 g.

The triethanolamine is added to the copolymer solution with mixing. Water is added to make 75 g. of 10% solution.

Example 26

Ethylene-maleic copolymer solution (Example 17)—50 g.
Sodium benzoate—0.2 g.
Sodium hydroxide 20% solution, q.s.—pH 3.1
Water, q.s.—100 g.

The copolymer is added to 60 cc. of hot water (95° C.) which contained the sodium benzoate with stirring. The suspension is heated on a steam bath and stirred until solution is complete. After cooling the sodium hydroxide is added with mixing. Water is added to make 100 g.

Example 27

Ethylene-maleic anhydride copolymer EMA-31—10 g.
Potassium sorbate—0.2 g.
Sodium hydroxide 20% solution, q.s.—pH 3.1
Water, q.s.—100 g.

The solution is prepared by the method described in Example 26.

Example 28

Ethylene-maleic anhydride copolymer EMA-31—60 g.
Methylparaben—1.02 g.
Propylparaben—0.18 g.
Sodium hydroxide 20% solution—30 cc.
Water, q.s.—600 g.

The copolymer is added to 500 cc. of hot water (95° C.) which contains the methyl and propylparaben. The suspension is heated on a steam bath and stirred until solution is complete. The sodium hydroxide is added with mixing. Water is added to make 600 g. and thoroughly mixed. The slightly viscous, faintly yellow solution has a pH of 3.4.

Example 29

Copolymer solution (Example 28)—98 g.
Propylene glycol—2 g.

The propylene glycol is added to the copolymer solution and thoroughly mixed.

Example 30

Copolymer solution (Example 28)—98 g.
Polyglycol E600 (polyethylene glycol having an average molecular weight of about 600)—2 g.

Prepared as per Example 29.

Example 31

Copolymer solution (Example 28)—98 g.
Polyglycol E4000—2 g.

Prepared as per Example 29.

Example 32

Copolymer solution (Example 28)—98 g.
Glycerine—2 g.

Prepared as per Example 29.

Example 33

Ethylene-maleic anhydride copolymer EMA-11—22.5 g.
Methylparaben—.255
Propylparaben—.045
Sodium hydroxide 20% solution— 45 cc.
Water, q.s.—150 g.

The copolymer is suspended in 900 cc. of hot water which contains the methyl- and propylparaben and heated on a steam bath with stirring until solution is complete. The sodium hydroxide is added with stirring. Water is added to make 150 g. and thoroughly mixed. The copolymer solution has a pH of 5.9.

Example 34

Ethylene-maleic-anhydride copolymer EMA-31—8 g.
Methylparaben—0.17 g.
Propylparaben—0.03 g.
Sodium hydroxide 20% solution—15 cc.
Water, q.s.—100 g.

The copolymer is suspended in 60 cc. of hot water which contains the methyl- and propylparaben. The mixture is heated on a steam bath with mixing until solution is complete. The sodium hydroxide is added with mixing. Water is added to make 100 g. and thoroughly mixed. The slightly viscous solution has a pH of 6.2.

In use, the solution of any of the examples is spread evenly over the skin and allowed to dry. The solution dries to a clear unobtrusive film.

Unlike albumin-based wrinkle-smoothing compositions, the compositions of this invention do not develop odors with aging. Not being nitrogenous, the compositions of this invention also do not support bacterial growth in the way the animal-product based compositions do.

Numerous variations in the compounding of compositions of this invention and their application will occur to those skilled in the art in the light of the foregoing description. For example, some coloring or texturing medium may be admixed with the solution for special cosmetic purposes, and the solution may be applied to limited areas.

Having thus described the invention, what is claimed and desired to be secured by Letters Patent is:

1. The method of temporarily smoothing wrinkled human skin by forming an unobtrusive film thereon which has the property of drawing indentations in the skin toward a common plane, which method comprises applying to the skin area to be smoothed a coating of an aqueous solution containing between 5 and 20% by weight of poly-N-vinyl-5-methyl-2-oxazolidinone having an average molecular weight of about 165,000, and permitting the solution to dry undisturbed to form a film on the skin.

2. The method of temporarily smoothing wrinkled human skin by forming an unobtrusive film thereon which has the property of drawing indentations in the skin toward a common plane, which method comprises applying to the skin area to be smoothed a coating of an aqueous solution containing between about 10 and 20% by weight of dextran with a molecular weight of between about 40,000 and 100,000 and permitting the solution to dry undisturbed to form a film on the skin.

3. The method of temporarily smothing wrinkled human skin by forming an unobtrusive film thereon which has the property of drawing indentations in the skin toward a common plane, which method comprises applying to the skin area to be smoothed a coating of a solution consisting essentially of water and between about 5 and 20% by weight of poly-N-vinyl-5-methyl-2-oxazolidinone, having an average molecular weight of about 165,000, and permitting the solution to dry undisturbed on the skin.

4. The method of claim 1 wherein the solution also contains 2 to 30% by weight of ethyl alcohol.

5. The method of temporarily smoothing wrinkled human skin by forming an unobtrusive film thereon which has the property of drawing indentations in the skin toward a common plane, which method comprises applying to the skin area to be smoothed a coating of a solution consisting essentially of about 5 to 10% by weight of poly-N-vinyl-5-methyl-2-oxazolidinone, having an average molecular weight of about 165,000, about 2 to 5% by weight of a low viscosity sodium carboxymethyl-cellulose, and water, and permitting the solution to dry undisturbed on the skin.

6. The method of temporarily smothing wrinkled human skin by forming an unobtrusive film thereon which has the property of drawing indentations in the skin toward a common plane, which method comprises applying to the skin area to be smoothed a coating of a solution consisting essentially of 15% by weight of dextran having a molecular weight of 50,000 to 90,000, and water, and permitting the solution to dry undisturbed on the skin.

7. The method of claim 2 wherein the solution also contains 20 to 30% by weight of ethyl alcohol.

8. The method of temporarily smoothing wrinkled human skin by forming an unobtrusive film thereon which has the property of drawing indentations in the skin toward a common plane, which method comprises applying to the skin area to be smoothed a coating of a solution consisting essentially of about 5 to 25% by weight of a polymeric composition taken from the group consisting of dextran, having a molecular weight of between about 40,000 and 100,000, poly-N-vinyl - 5-methyl-2-oxazolidinone, having an average molecular weight of about 165,000, and ethylene maleic anhydride copolymer, having a viscosity in the general range of 2.0 to 7.0 cps., in a 2% solution in the acid form, and water, and permitting the solution to dry undisturbed on the skin.

9. The method of temporarily smoothing wrinkled human skin by forming an unobtrusive film thereon which has the property of drawing indentations in the skin toward a common plane, which method comprises applying to the skin area to be smoothed a coating of a solution consisting essentially of 5 to 25% by weight of ethylene-maleic anhydride copolymer having a viscosity in the general range of 2.0 to 7.0 cps., in a 2% solution in the acid form, and water, and permitting the solution to dry undisturbed on the skin.

10. The method of claim 1 wherein the coating solution also includes 1 to 5% by weight of a plasticizer and moisturizing agent taken from the group consisting of propylene glycol, polyethylene glycol 200, polyethylene glycol 600, polyethylene glycol, 4,000, and glycerine.

References Cited

UNITED STATES PATENTS

| | | | |
|---|---|---|---|
| 3,227,616 | 1/1966 | Van Wessem et al. | 424—361 |
| 3,341,319 | 9/1967 | Hibbard | 424—78 X |

ALBERT T. MEYERS, Primary Examiner

D. R. ORE, Assistant Examiner

U.S. Cl. X.R.

424—63

UNITED STATES PATENT OFFICE
CERTIFICATE OF CORRECTION

Patent No. 3,523,998                                      August 11, 1970

Wolffe Harry Feinstone et al.

It is certified that error appears in the above identified patent and that said Letters Patent are hereby corrected as shown below:

Column 1, line 52, "portion solution" should read -- protein solution --; line 63, "denaturalization" should read -- denaturization --. Column 3, line 33, "cpc." should read -- cps. --. Column 4, line 47, In Example 7, cancel "Water, q.s.---100 ml." and insert the same after line 48, same column 4. Column 5, line 13, "Ethylene-(maleic anhydride copolymer EMA-11)" should read -- Ethylene-maleic anhydride copolymer EMA-11 --; line 23, "Ethylene (maleic anhydride copolymer EMA-11)" should read -- Ethylene-maleic anhydride copolymer EMA-11 --. Column 6, line 41, "aws" should read -- was --; line 42, "slight" should read -- slightly --. Column 7, line 53, "900 cc." should read -- 90 cc. --. Column 10, line 4, "glycol," should read -- glycol --.

Signed and sealed this 2nd day of March 1971.

(SEAL)
Attest:

EDWARD M. FLETCHER, JR.                            WILLIAM E. SCHUYLER, JR.
Attesting Officer                                     Commissioner of Patents